(12) United States Patent
Zhou et al.

(10) Patent No.: US 10,582,305 B2
(45) Date of Patent: *Mar. 3, 2020

(54) ELECTROSTATIC GRAPHENE SPEAKER

(71) Applicant: THE REGENTS OF THE UNIVERSITY OF CALIFORNIA, Oakland, CA (US)

(72) Inventors: Qin Zhou, Fremont, CA (US); Alexander K. Zettl, Kensington, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,847

(22) Filed: Aug. 16, 2019

(65) Prior Publication Data

US 2019/0379983 A1 Dec. 12, 2019

Related U.S. Application Data

(63) Continuation of application No. 14/737,903, filed on Jun. 12, 2015, now Pat. No. 10,425,742, which is a
(Continued)

(51) Int. Cl.
*H04R 19/00* (2006.01)
*H04R 29/00* (2006.01)
*B82Y 15/00* (2011.01)

(52) U.S. Cl.
CPC ......... *H04R 19/005* (2013.01); *H04R 29/001* (2013.01); *B82Y 15/00* (2013.01); *Y10S 977/733* (2013.01)

(58) Field of Classification Search
CPC combination set(s) only.
See application file for complete search history.

(56) References Cited

U.S. PATENT DOCUMENTS 3,544,733 A 12/1970 Reylek
3,646,280 A 2/1972 Tamura
(Continued)

FOREIGN PATENT DOCUMENTS

| EP | 0048902 A | 4/1982 |
|---|---|---|
| WO | 2011/142637 A2 | 11/2011 |
| WO | 2014/100012 A1 | 6/2014 |

OTHER PUBLICATIONS

Bunch, J. Scott, et al, "Electromechanical Resonators from Graphene Sheets," Jan. 26, 2017, retrieved from http://science.sciencemag.org on Feb. 1, 2018, Science Magazine, vol. 315, pp. 490-493.
(Continued)

*Primary Examiner* — Duc Nguyen
*Assistant Examiner* — Assad Mohammed
(74) *Attorney, Agent, or Firm* — Womble Bond Dickinson (US) LLP; Daniel E. Ovanezian

(57) ABSTRACT

This disclosure provides systems, methods, and apparatus associated with an electrostatically driven graphene speaker. In one aspect, a device includes a graphene membrane, a first frame on a first side of the graphene membrane, and a second frame on a second side of the graphene membrane. The first frame and the second frame both include substantially circular open regions that define a substantially circular portion of the graphene membrane. A first electrode is proximate the first side of the circular portion of the graphene membrane. A second electrode proximate the second side of the circular portion of the graphene membrane.

20 Claims, 5 Drawing Sheets

Related U.S. Application Data continuation of application No. PCT/US2013/075821, filed on Dec. 17, 2013.

(60) Provisional application No. 61/740,058, filed on Dec. 20, 2012.

(56) References Cited

U.S. PATENT DOCUMENTS

| | | | |
|---|---|---|---|
| 3,894,199 A * | 7/1975 | Tamura | H04R 19/013 381/116 |
| 4,246,448 A | 1/1981 | Tam | |
| 4,640,382 A | 2/1987 | Hartmann | |
| 4,655,086 A | 4/1987 | Mielnicka-Pate et al. | |
| 8,114,697 B2 | 2/2012 | Kim et al. | |
| 8,155,356 B2 | 4/2012 | Liou et al. | |
| 8,196,282 B2 * | 6/2012 | Chen | H04R 31/006 29/592.1 |
| 8,270,253 B1 | 9/2012 | Roche et al. | |
| 2003/0052970 A1 | 3/2003 | Dodds et al. | |
| 2006/0113671 A1 | 6/2006 | Isa et al. | |
| 2007/0242843 A1 | 10/2007 | Matsuzawa | |
| 2008/0025531 A1 | 1/2008 | Suzuki et al. | |
| 2010/0142325 A1 | 6/2010 | Altman et al. | |
| 2010/0188796 A1 * | 7/2010 | Bulovic | B81C 1/0046 361/280 |
| 2010/0260370 A1 | 10/2010 | Chen et al. | |
| 2012/0148071 A1 * | 6/2012 | Dehe | H04R 31/00 381/116 |
| 2012/0182548 A1 | 7/2012 | Harb | |
| 2012/0250907 A1 | 10/2012 | Jiang | |
| 2012/0308415 A1 * | 12/2012 | Pinkerton | F04B 43/043 417/413.1 |
| 2014/0270271 A1 | 9/2014 | Dehe et al. | |

OTHER PUBLICATIONS

Castellanos-Gomez, Andres, et al, "Mechanics of freely-suspended ultrathin layered materials," Oct. 8, 2014, Annalen der Physik (Berlin), vol. 527, No. 1-2, pp. 27-44.

Zhou, Qin et al, "Graphene electrostatic microphone and ultrasonic radio," PNAS Jul. 21, 2015, vol. 112, No. 29, pp. 8942-8946.

Lee C, Wei X, Kysar JW, Hone J (Jul. 18, 2008) "Measurement of the elastic properties and intrinsic strength of monolayer graphene," Science Magazine, vol. 321, (5887): pp. 385-388.

Kay L (1964) "An ultrasonic sensing probe as a mobility aid for the blind." Ultrasonics 2(2):53-59.

Alemán B, et al. (2013) "Polymer-free, low tension graphene mechanical resonators." Phys Status Solidi Rapid Res Lett 7(12):1064-1066.

Yu, C. B., et al. "Highly sensitive fiber-optic Fabry-Perot geophone with graphene-coated PMMA membrane." Optical Fiber Sensors Conference (OFS), 2017 25th. IEEE, 2017.

HM, Rahmat Zaki Auliya, Mohd Anuar Md Ali, and Mohd Syakirin Rusdi. "Graphene MEMS capacitive microphone: highlight and future perspective." Scientific Journal of PPI-UKM 3.4 (2016): 187-191.

Wu, Yu, et al. "A highly sensitive fiber-optic microphone based on graphene oxide membrane." Journal of Lightwave Technology (2017).

Todorović, Dejan, et al. "Multilayer graphene condenser microphone." 2D Materials 2.4 (2015): 045013.

PCT/US2016/019373, International Search Report dated Jun. 9, 2016, 2 pages.

Shin et al., Flexible and transparent graphene films as acoustic actuator electrodes using inkjet printing , Chem. Commun., 2011,47, 8527-8529.

Qin Zhou and A. Zettl, Electrostatic graphene loudspeaker, Appl. Phys. Lett. 102, 223109 (2013).

J. J. Gu et al., Wing stridulation in a Jurassic katydid (Insecta, Orthoptera) produced low-pitched musical calls to attract females, Proc. Natl. Acad. Sci. U.S.A 109(10), 3868 (2012).

J. S. Bunch et al., Electromechanical Resonators from Graphene Sheets, Science 315(5811), 490 (2007).

C. Chen et al., Performance of monolayer graphene nanomechanical resonators with electrical readout, Nat. Nlanotechnol. 4(12), 861 (2009).

A. Eichler et al., Nonlinear damping in mechanical resonators made from carbon nanotubes and graphene, Nat. Nanotechnol. 6(6), 339 (2011).

Y. Xu et al., Radio frequency electrical transduction of graphene mechanical resonators, Appl. Phys. Lett. 97(24), 243111 (2010).

A. M. Van Der Zande et al., Large-Scale Arrays of Single-Layer Graphene Resonators, Nano Lett. 10(12), 4869 (2010).

R. A. Barton et al., High, Size-Dependent Quality Factor in an Array of Graphene Mechanical Resonators, Nano Lett. 11(3), 1232 (2011).

H. Tian et al., Graphene-on-Paper Sound Source Devices, ACS Nano 5(6), 4878 (2011).

H. Tian et al., Single-layer graphene sound-emitting devices: experiments and modeling, Nanoscale 4(7), 2272 (2012).

J.W. Suk et al., Thermoacoustic Sound Generation from Monolayer Graphene for Transparent and Flexible Sound Sources, Adv. Mater. 24, 6342-6347 (2012).

L. Xiao et al., Flexible, Stretchable ,Transparent Carbon Nanotube Thin Film Loudspeakers, Nano Lett. 8(12), 4539 (2008).

A.G. Nasibulin et al., Multifunctional Free-Standing Single-Walled Carbon Nanotube Films, ACS Nano 5(4), 3214 (2011).

A. E. Aliev et al., Underwater Sound Generation Using Carbon Nanotube Projectors, Nano Lett. 10(7), 2374 (2010).

International Search Report and Written Opinion for International Application No. PCT/US2013/075821 dated Apr. 23, 2014.

* cited by examiner

ELECTROSTATIC GRAPHENE SPEAKER

RELATED APPLICATIONS

This application is a continuation of U.S. patent application Ser. No. 14/737,903, filed Jun. 12, 2015, which is a continuation of International Application No. PCT/US2013/075821, filed Dec. 17, 2013, which claims priority to U.S. Provisional Patent Application No. 61/740,058, filed Dec. 20, 2012, the entire contents of which are herein incorporated by reference.

STATEMENT OF GOVERNMENT SUPPORT

This invention was made with government support under Contract No. DE-AC02-05CH11231 awarded by the U.S. Department of Energy, under Grant No. N00014-09-1066 awarded by the Office of Naval Research, and under Grant No. EEC-083819 awarded by the National Science Foundation. The government has certain rights in this invention.

TECHNICAL FIELD

This disclosure relates to devices including graphene, and more specifically to a graphene speaker.

BACKGROUND

Efficient audio sound transduction has a history dating back millions of years. Primitive insect singers generated loud and pure-tone sound with high efficiency by exciting resonators inside their bodies. Male crickets generate chirping sounds via stridulation, where the scraper edge of one wing is rubbed against the ribbed edge of the other wing. Advantageous structural properties of the wings (i.e., relatively large, low-mass flexural membranes) allow efficient muscle-to-sound energy transduction.

In a human context, unnatural (i.e., non-voice) sound production has been explored for millennia, with classic examples being drumheads and whistles for long-range communications and entertainment. In modern society, efficient small-scale audio transduction is ever more important for discrete audio earphones and microphones in portable or wireless electronic communication devices.

For human audibility, an ideal speaker or earphone should generate a constant sound pressure level (SPL) from 20 Hz to 20 kHz, i.e., it should have a flat frequency response. Currently, most commercial speakers are diaphragm based, and most of the diaphragms are driven by a magnetic coil. Because the coil moves together with the diaphragm, the total effective mass becomes large. As a result, the high frequency response may be poor.

To overcome poor high frequency response, acoustic engineers manipulate damping, which basically decreases the response at lower frequencies to make the total response curve flat. It is difficult, however, to engineer an arbitrary damping curve at all frequencies. Further, the damping complicates the acoustic design of the speaker and can increase the fabrication cost significantly. Another problem created by a large effective mass is that it stores kinetic energy which can be released later to jeopardize the music transparency (e.g., the diaphragm does not start or stop immediately with the input signal).

SUMMARY

Graphene has extremely low mass density and high mechanical strength, key qualities for an efficient wide-frequency-response electrostatic audio speaker design. Low mass may enable good high frequency response, while high strength may allow for relatively large free-standing diaphragms necessary for effective low frequency response. Disclosed herein are the fabrication and testing of a miniaturized graphene-based electrostatic audio transducer. The speaker/earphone has good frequency response across the entire audio frequency range (20 HZ-20 kHz), with performance matching or surpassing commercially available audio earphones.

In one aspect, a graphene diaphragm, biased by a DC source, is suspended midway between two perforated electrodes driven at opposite polarity. A varying electrostatic force drives the graphene diaphragm which in turn disturbs air and emits sound through the electrodes. The light mass and low spring constant of the graphene diaphragm, together with strong air damping, allow for high-fidelity broad-band frequency response. Such a speaker also may have a high power efficiency.

Another innovative aspect of the subject matter described in this disclosure can be implemented in a device including a graphene membrane, a first frame on a first side of the graphene membrane, and a second frame on a second side of the graphene membrane. The first frame and the second frame both include substantially circular open regions that define a substantially circular portion of the graphene membrane. The device further includes a first electrode proximate the first side of the circular portion of the graphene membrane, and a second electrode proximate the second side of the circular portion of the graphene membrane.

In some embodiments, the device further includes a wire in electrical contact with the graphene membrane. In some embodiments, the wire is a gold wire with a diameter of about 10 microns to 30 microns.

In some embodiments, the graphene membrane is about 20 nanometers to 40 nanometers thick. In some embodiments, the first electrode and the second electrode define open regions having a dimension of about 200 microns to 300 microns. In some embodiments, the circular portion of the graphene membrane has a diameter of about 5 millimeters to 9 millimeters. In some embodiments, the first frame and the second frame are about 60 microns to 180 microns thick.

In some embodiments, the first electrode and the second electrode include silicon wafers. In some embodiments, the first electrode and the second electrode further include an oxide layer on surfaces of the silicon wafers.

In some embodiments, the first electrode is in contact with the first frame and the first electrode is spaced a first distance of about 60 microns to 180 microns from the first side of the circular portion of the graphene membrane. The second electrode is in contact with the second frame, and the second electrode is spaced a second distance of about 60 microns to 180 microns from the second side of the circular portion of the graphene membrane.

In some embodiments, the first frame and the second frame are a unitary body.

Another innovative aspect of the subject matter described in this disclosure can be implemented in a method including provide a device. The device includes a graphene membrane, a first frame on a first side of the graphene membrane, and a second frame on a second side of the graphene membrane. The first frame and the second frame both include substantially circular open regions that define a substantially circular portion of the graphene membrane. The device further includes a first electrode proximate the first side of the circular portion of the graphene membrane, and a second electrode proximate the second side of the circular portion of the graphene membrane. The graphene membrane is biased with a direct current voltage. The first electrode and the second electrode are biased with an input signal, causing the graphene membrane to move and generate a sound.

In some embodiments, the input signal is generated from an audio signal. In some embodiments, the direct current voltage is about 50 volts to 150 volts. In some embodiments, an amplitude of the input signal is about 0 volts to 15 volts. In some embodiments, the first electrode and the second electrode are biased at opposite polarities.

Details of embodiments of the subject matter described in this specification are set forth in the accompanying drawings and the description below. Note that the relative dimensions of the following figures may not be drawn to scale.

DETAILED DESCRIPTION

Figure 1A:
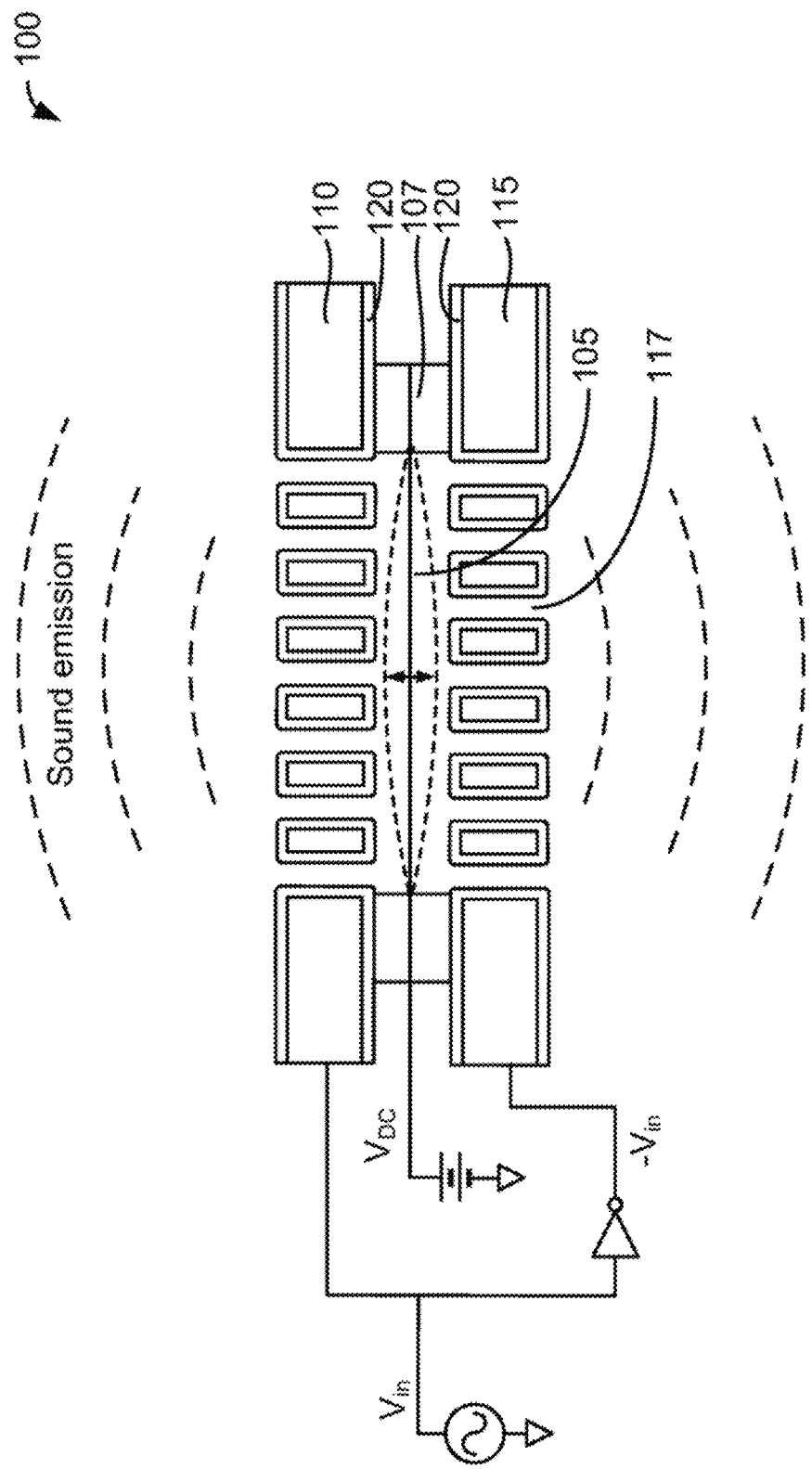
FIG. 1A shows an example of a cross-sectional schematic illustration of an electrostatically driven graphene speaker (EDGS).

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

INTRODUCTION

One approach to response spectrum broadening for speakers is to reduce both the mass and spring constant of the diaphragm so that inherent air damping dominates and flattens the response peaks. Moreover, with ambient air serving as the dominant damping mechanism, most input energy is converted to a sound wave, which makes such speakers highly power efficient. For these reasons, the ideal audio transduction diaphragm should have small mass and a soft spring constant, and be non-perforated to efficiently displace the surrounding air.

Electrostatically-driven thin-membrane loudspeakers employing an electrically conducting, low mass diaphragm with significant air damping have been under development since the 1920's (e.g., the first were made of pig intestine covered with gold-leaf), but miniaturized electrostatic earphones are still rare. One reason is that the per-area air damping coefficient significantly decreases when the size of the diaphragm falls below the sound wavelength. Hence, for small speakers, a thinner and lower mass density diaphragm is required to continue the dominance of air damping. Such a diaphragm is difficult to realize. For example, if conventional materials such as metalized Mylar) are made too thin, they may fatigue and break.

Graphene is an ideal material for small, efficient, high-quality broad-band audio speakers because it satisfies all the above criteria. It is electrically conducting, has a small mass density, and can be configured to have small effective spring constant. The effective spring constant of a thin circular membrane is $$k_{eff} = 4\pi \sigma t \qquad (1)$$

where σ is the stress and t is the thickness of the membrane. It is convenient to use per-area values for modeling the diaphragm vibration since for a given membrane, the mass per unit area is constant. The equivalent per area spring constant is therefore $$k = \frac{k_{eff}}{Area} = \frac{4\sigma t}{R^2} \qquad (2)$$

where R is the radius of the circular membrane. Note that the spring constant k scales proportionally with the thickness of the membrane and inversely with the 2nd power of the radius of the membrane. The exceptional mechanical strength of graphene makes it possible to construct large and thin suspended diaphragms, which effectively reduces k.

Graphene has been previously used to construct a thermoacoustic loudspeaker. In the thermoacoustic configuration, graphene serves as a stationary heater to alternately heat the surrounding air, thereby producing, via thermal expansion, a time-dependent pressure variation (i.e., a sound wave). The method is effective in the ultrasonic region because of graphene's small heat capacity; for this reason, carbon nanotube films can also be utilized. However, for thermoacoustic speakers operating at audio frequencies, most of the input energy is dissipated by heat conduction through the air and does not generate sound. For example, the power efficiency for a graphene thermoacoustic speaker is exceedingly small, decreasing from $\sim 10^{-6}$ at 20 kHz to $\sim 10^{-8}$ at 3 kHz. The thermoacoustic approach also suffers from sound distortion because the heating power is proportional to the square of the input signal, and the transduction is therefore intrinsically non-linear.

Apparatus

Described herein are embodiments of an electrostatically driven, high-efficiency, mechanically vibrating graphene diaphragm-based audio speaker. Even without optimization of the speaker design, a test speaker was able to produce excellent frequency response across the whole audible region (about 20 Hz to 20 KHz), comparable or superior to the performance of conventional-design commercial counterparts.

Figure 1B:
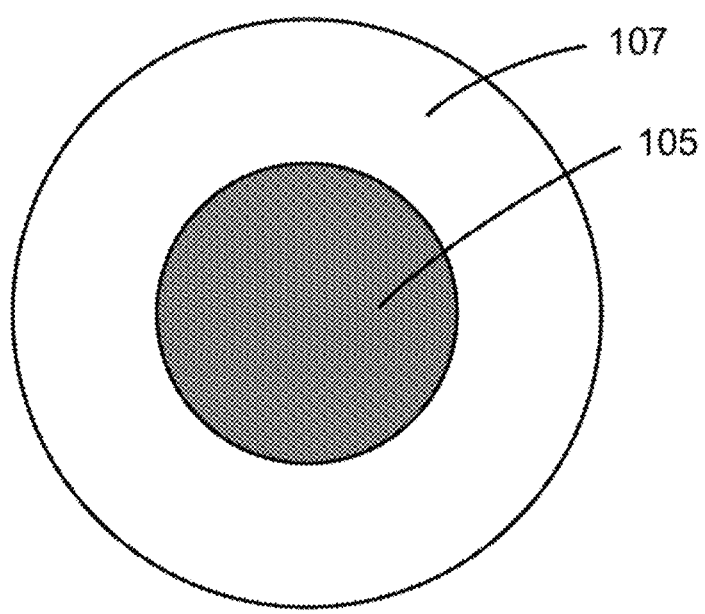
FIG. 1B shows an example of a graphene membrane suspended in a frame.

FIG. 1A shows an example of a cross-sectional schematic diagram of an electrostatically driven graphene speaker (EDGS) 100. The EDGS 100 includes a graphene membrane 105 suspended in a frame 107 (see FIG. 1B for a top-down view) approximately midway between two electrodes 110 and 115. In some embodiments, the graphene membrane 105 is a monolayer graphene membrane (i.e., a single layer of graphene). In some embodiments, the graphene membrane 105 is a multilayer graphene membrane. For example, the graphene membrane 105 may include about 1 to 100 layers of graphene. In some embodiments, the graphene membrane 105 is about 20 nanometers (nm) to 40 nm thick, or about 30 nm thick.

The frame 107 allows for a portion of the graphene membrane 105 to be suspended or not in contact with other materials. Suspending the graphene membrane 105 in the frame 107 in this manner may form a graphene diaphragm; a diaphragm is a sheet of a semi-flexible material anchored at its periphery. In some embodiments, the frame is a disk of material defining a substantially circular open region, typically in a central portion of the disk. That is, in some embodiments, the frame is similar to a hardware washer; a washer is a thin plate of material (typically disk-shaped) with a hole (typically circular and in the middle) though it. In some embodiments, the frame is about 120 microns to 360 microns thick, or about 240 microns thick. In some embodiments, the frame has an outer diameter of about 7 millimeters (mm) to 21 mm, or about 14 mm. The open region defined by the frame may have a diameter of about 3 mm to 11 mm, or about 7 mm.

In some embodiments, the frame may include other configurations. For example, the frame may define an open region having a rectangular, square, or oval shape, with the material of the frame designed to suspend the graphene membrane in this open region.

In some embodiments, the graphene membrane 105 is mounted about midway along the thickness of the frame 107. For example, when the frame 107 is about 240 microns thick, the graphene membrane 105 may be mounted to the frame 107 such that about 120 microns of the frame extend from each side of the graphene membrane. In some embodiments, the graphene membrane is offset from the midpoint along the thickness of the frame.

In some embodiments, the frame 107 is a polymer, metal, or semiconducting material. Many different materials could be used for the frame, as long as the material has sufficient mechanical strength to support the graphene membrane 105 and to allow for incorporation of the frame 107 into the EDGS 100.

In some embodiments, the frame 107 includes two parts, such that the graphene membrane 105 is attached to one part of the frame and then the other part of the frame is stacked on top of the graphene membrane, sandwiching the graphene membrane between the two parts of the structure. For example, a graphene membrane could be suspended in a frame by aligning and attaching two hardware washer shaped parts to either side of the graphene membrane.

In some embodiments, the graphene membrane 105 is in electrical contact with a terminal (not shown). In some embodiments, the terminal is a metal wire. For example, in some embodiments, the terminal is a gold wire that is about 10 microns to 30 microns thick, or about 20 microns thick. In some embodiments, terminals of other materials and of other dimensions may be used.

The electrodes 110 and 115 are configured to actuate the graphene membrane 105. In some embodiments, the electrodes 110 and 115 include perforations 117 so that sound may be emitted from the EDGS 100. The perforations 117 are though-holes in the electrodes 110 and 115. The perforations 117 may have any cross-section. For example, in some embodiments, the perforations 117 may have a square cross-section. In some embodiments, the perforations 117 may have a dimension of about 200 microns to 300 microns, or about 250 microns. For example, when the perforations 117 have a square cross-section, the side of a perforation may be about 200 microns to 300 microns; when the perforations 117 have a circular cross-section, the diameter of a perforation may be about 200 microns to 300 microns. In some embodiments, the electrodes are about 425 microns to 625 microns thick, or about 525 microns thick.

In some embodiments, one of the electrodes 110 or 115 includes perforations so that sound may be emitted from the EDGS 100. The other electrode may define an open region, and not necessarily perforations. The open region may allow the graphene membrane to move; i.e., the open region may allow for air/gas to enter and exit from between the electrode and the membrane, which could hinder the movement of the membrane.

The electrodes 110 and 115 may be any material that is capable of conducting electricity. In some embodiments, the electrodes 110 and 115 are silicon electrodes. In some embodiments, an oxide layer 120 is deposited or formed on the electrodes 110 and 115 to prevent the graphene membrane 105 from shorting to the electrodes 110 and 115 at large drive amplitudes when the EDGS is in operation. In some embodiments, the oxide layer 120 is about 400 nm to 600 nm thick, or about 500 nm thick. In some embodiments, the oxide layer is a $SiO_2$ layer.

Figure 2:
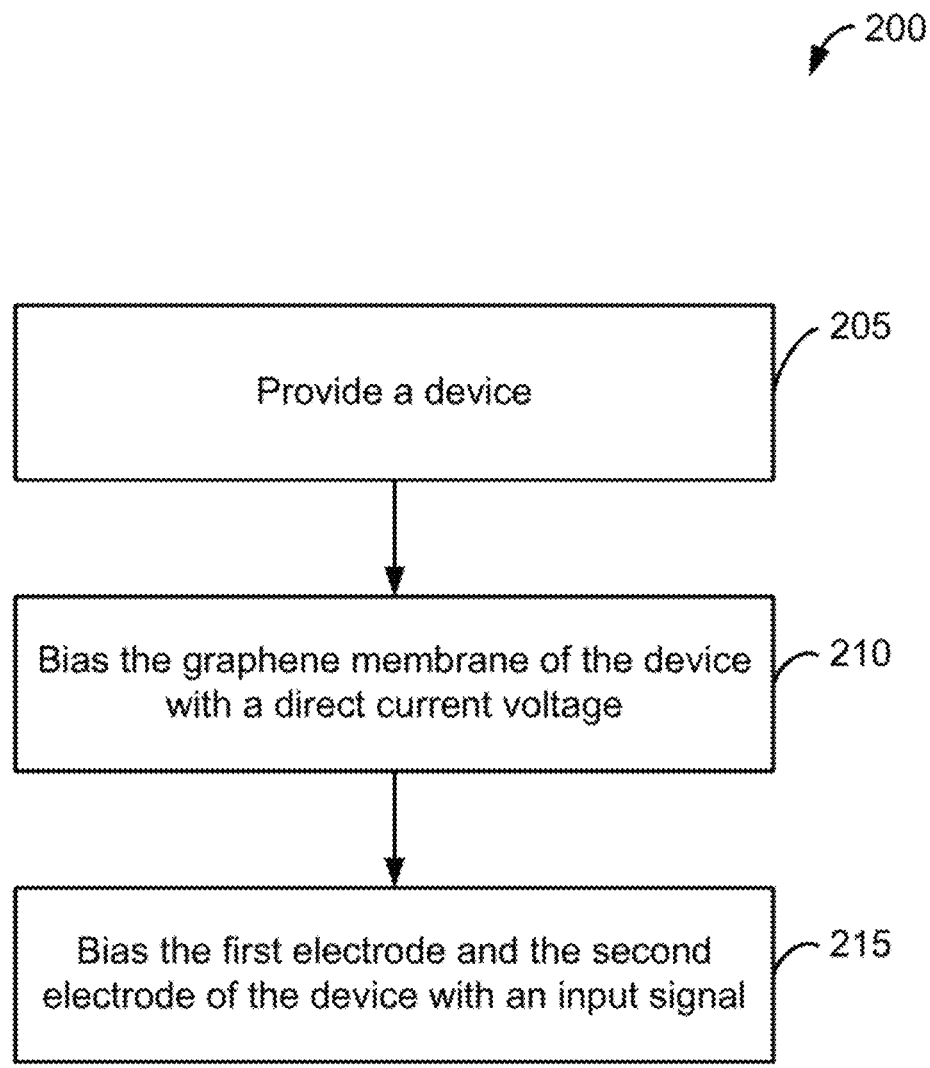
FIG. 2 shows an example of a method of use of a device including a graphene membrane.

FIG. 2 shows an example of a method of use of a device including a graphene membrane. The method 200 may be similar to elements of the prototype demonstration of an EDGS device described below. Starting at block 205, a device is provided. The device may be an EDGS, similar to a device as described above with respect to FIGS. 1A and 1B. At block 210, the graphene membrane of the device is biased with a direct current voltage. At block 215, the first electrode and the second electrode of the device are biased with an input signal. Biasing the first electrode and the second electrode may cause the graphene membrane of the device to move and generate a sound.

In some embodiments, the input signal is generated from an audio signal. In some embodiments, an amplitude of the input signal is about 0 volts to 15 volts. In some embodiments, the direct current voltage applied to the graphene membrane is about 50 volts to 150 volts. In some embodiments, the first electrode and the second electrode are biased at opposite polarities.

EXAMPLES

The following examples are intended to be examples of the embodiments disclosed herein, and are not intended to be limiting.

To fabricate an EDGS device, graphene was first synthesized and then attached to a frame, which was then sandwiched between separately fabricated electrodes. Multilayer graphene was synthesized on an about 25 micron thick nickel foil in a chemical vapor deposition (CVD) furnace at about 100° C. The nickel foil was first annealed at about 1000° C. for about 1 hour with about 50 sccm hydrogen flow at about 200 mTorr, after which the hydrogen flow was increased to about 100 sccm and methane was introduced at about 5 sccm to start the growth process. The growth pressure was about 2 Torr. After about 20 minutes, the furnace was turned off and the nickel foil was quickly removed from the hot zone to allow the formation of graphene layers.

After the growth, a self-adhesive circular frame (e.g., 60 microns thick) with an about 7 mm diameter opening was attached to the graphene layer on the nickel foil. The foil was then etched away with an about 0.1 g/ml FeCl$_3$ solution, so that the graphene membrane was only attached to and supported by the frame. The frame was first transferred to a fresh deionized (DI) water bath several times to clean the etchant residue, and then immersed in acetone. The multi-layer graphene diaphragm may be strong enough to be directly dried in air by pulling the frame out from acetone. In one experimental fabrication process, the thickness of a free-standing graphene diaphragm was determined by light transmission measurement to be about 30 nm thick (e.g., about 22% to 25% transmission) using the above-described fabrication process.

Electrical contact to the graphene membrane was made by attaching an about 20 micron diameter gold wire to the portion of graphene lying on the supporting frame. Another circular frame was attached to the original frame from the opposite side (so that the graphene diaphragm was sandwiched between them) to fix the gold wire. The frames also served as spacers between graphene and the electrodes in the speaker assembly. The gap distance can be increased by stacking multiple (empty) frames on each other. For the EDGS used to generate the results presented below, two frames on each side of the graphene were used, which gave a gap distance d of about 120 microns.

The electrodes were constructed from silicon (about 525 microns thick, resistivity of about 10 Ohm·cm, test grade). Photolithography and deep-reactive-ion-etching operations were used to construct through-wafer square holes of about 250 microns wide as sound emitting windows. An about 500 nm thick protective wet thermal oxide layer was then grown on the wafer at 1050° C. The wafer was then diced into individual electrodes. Dicing the wafer also exposed the silicon so that electric connections are made by attaching conductive wires to the edges of the electrodes, for example, with silver paste.

To operate the EDGS, the graphene of the EDGS is DC biased at $V_{DC}$. With no input signal, the electrostatic forces from the upper electrode and the lower electrode balance. When the two electrodes are driven with opposite polarity at $V_{in}$, the total electrostatic force applied on graphene is (per unit area)

$$F = F_1 - F_2 = \frac{\varepsilon}{2d^2}(V_{DC} + V_{in})^2 - \frac{\varepsilon}{2d^2}(V_{DC} - V_{in})^2 = \frac{\varepsilon V_{DC}}{d^2}V_{in} \quad (3)$$

where $F_1$ and $F_2$ are force magnitudes due to the respective electrodes, $\varepsilon$ is the electric permittivity of air, and d is the nominal distance between graphene and electrodes. Eq. (3) shows that the actuating force is linearly proportional to the input signal, an advantage for low sound distortion.

For prototype demonstration, two electrodes and one graphene diaphragm were sandwiched together and held by a spring clip. In another implementation, a 7 mm inner-diameter pipe, serving as a wave guide, was perpendicularly attached to the surface of the electrodes to facilitate sound coupling between the speaker and a listener's ear. A wave guide will improve far-field efficiency for a small speaker operating at wavelength larger than the diaphragm size.

Described below are prototype demonstration tests for the EDGS. $V_{DC}$=100 V was used to bias the EDGS device, and the input sound signal was introduced from a signal generator or from a commercial laptop or digital music player. The maximum amplitude of the input signal $V_{in}$ used in the test was 10 V. The operation current was usually a few nano-amps, indicating very low power consumption (i.e., much less than 1 µW) and high power efficiency. In fact, the power efficiency of an electrostatic speaker can be very high (i.e., close to 1) because the power dissipation path is almost pure air damping, which converts the mechanical vibration of diaphragm to sound. Magnetic coil type earphones, the type used today for virtually all earphone applications, typically have efficiencies less than 0.1.

The sound generated by the graphene speaker was easily audible by the human ear. The fidelity was qualitatively excellent when listening to music. To quantitatively characterize the speaker, the frequency response curve was measured from 20 Hz to 20 kHz and compared to a commercial earphone of similar size. The sound card in a laptop computer was used to generate equal-amplitude sine waves, and a commercial condenser microphone was used to measure the sound pressure level (SPL) at different frequencies.

Figures 3A, 3B, 3C:
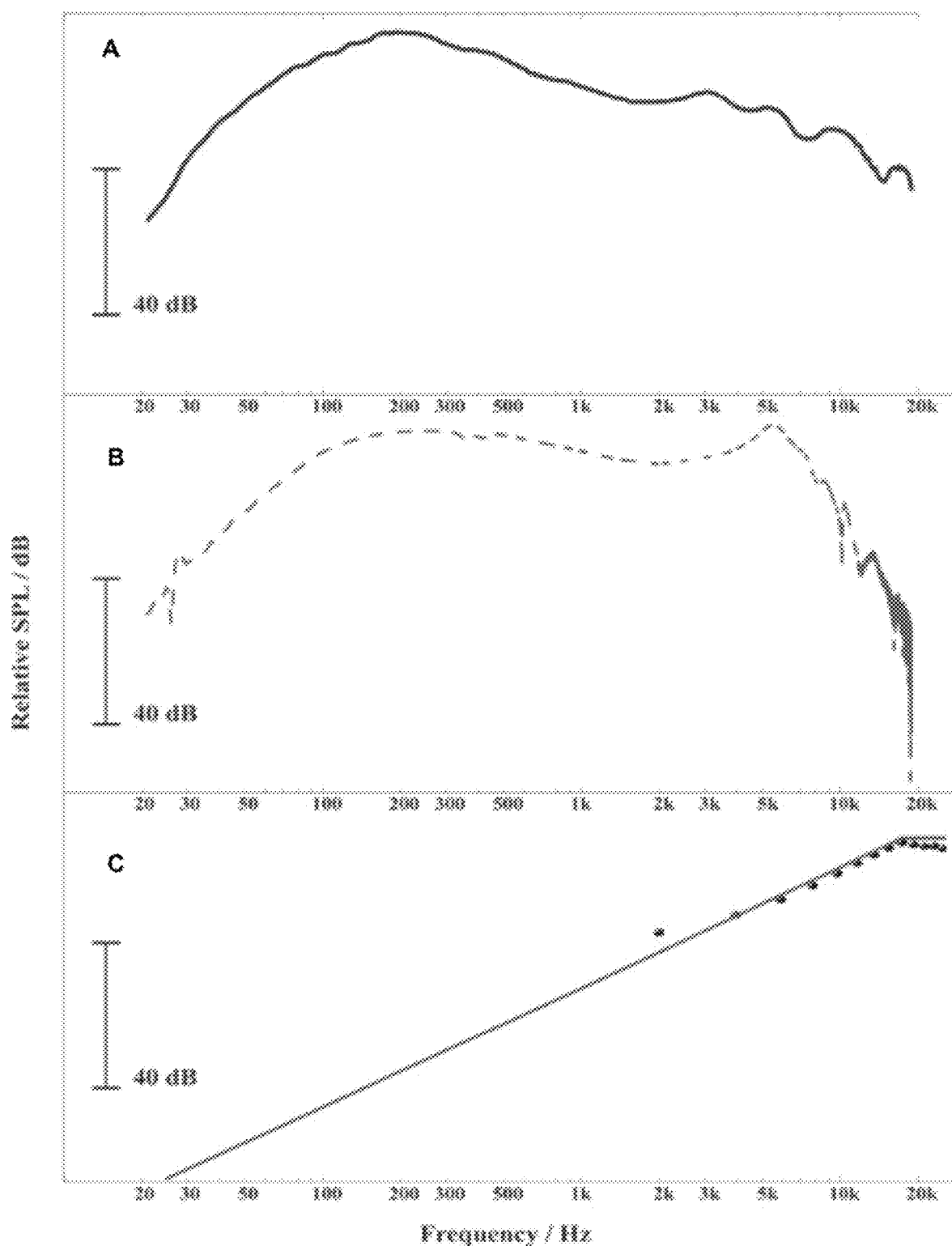
FIG. 3A-3C show examples of the frequency response of various miniature audio speakers.

As can be seen in FIGS. 3A and 3B, the graphene speaker (FIG. 3A), with almost no specialized acoustic design, performed comparably to a high quality commercial earphone (FIG. 3B). Moreover, the high-frequency performance of the EDGS, both in terms of maintaining high response and avoiding sharp resonances (the slow oscillations in the EDGS curve were due to sound wave interference in the space between the speaker and microphone and they depend on the relative position of the speaker and microphone, but the main trend is consistent), was markedly better than that of the commercial earphone (FIG. 3B) due to the low-mass diaphragm. In the low frequency region, the EDGS and commercial earphone response curves both bend downward, likely due to limited capability of the sensing microphone and restricted coupling between the speaker and microphone. Nevertheless, the low-frequency performance of the EDGS was markedly better than that predicted for a thermoacoustic speaker (FIG. 3C; points in FIG. 3C are experimental data, while the solid line is the theoretically predicted behavior for an ideal thermoacoustic speaker). At very high frequencies (>10 kHz), the thermoacoustic speaker maintained its good high frequency response, but, as noted above, the power efficiency was at least six orders of magnitude lower than that for the EDGS, which makes it impractical for most portable applications.

Figure 4:
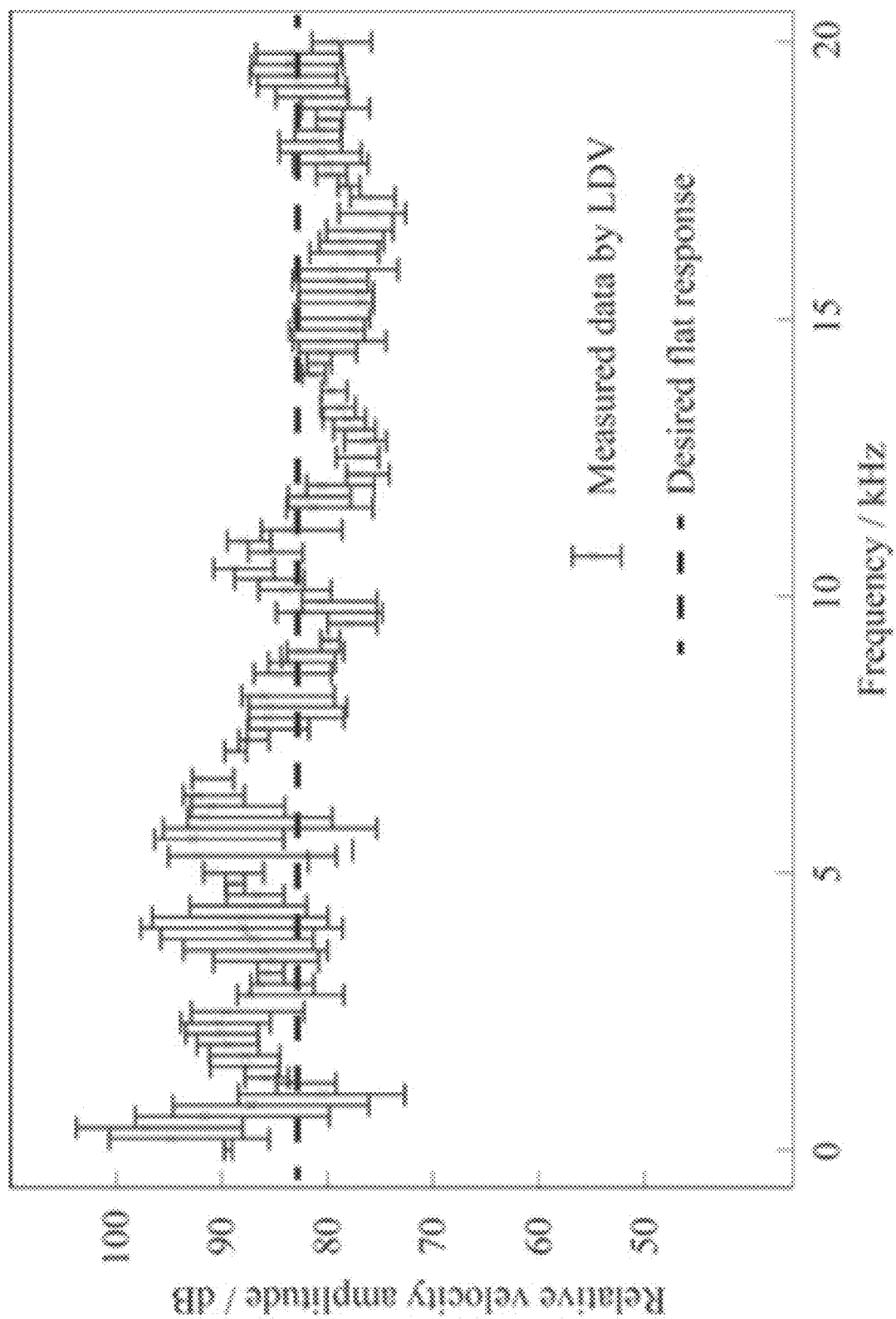
FIG. 4 shows the vibration velocity of a graphene diaphragm in the EDGS versus frequency, measured by Laser Doppler Velocimetry (LDV).

The speaker-to-microphone performance test had limited accuracy, because the measured response curve is for the whole system—from the sound card to amplifier, to speaker, to microphone, and finally back to sound card. Every transduction introduces some distortion in the measurement. For example, the response was sensitive to the relative position between the speaker and the microphone. To further demonstrate the capability of the EDGS graphene diaphragm, a laser Doppler velocimetry (LDV) was employed to directly measure the mechanical response limits of the diaphragm. Such a measurement is useful because it eliminates extrinsic effects (e.g., acoustic structural design, sound card, and microphone response), and represents the "pure" response of the graphene diaphragm itself. The measured frequency response is illustrated in FIG. 4. Within experimental error, the LDV frequency response curve for the EEGS diaphragm is relatively flat from 20 Hz to 20 kHz, which is the desired response of an ideal speaker diaphragm.

CONCLUSION

In summary, a robust speaker including a graphene diaphragm (e.g., single-layer of multi-layer) is disclosed herein. The diaphragm is driven electrostatically and can reproduce sound with high fidelity. Further, the technique can be scaled to construct larger speakers by arraying the graphene diaphragm.

An EDGS device as described herein could also serve as a microphone. The microphone should also have outstanding response characteristics due to the graphene's low mass and the good coupling to ambient air.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A device comprising:
   a graphene membrane having a diameter of about 5 millimeters to 9 millimeters;
   a first electrode proximate a first side of the graphene membrane, the first electrode being electrically conductive and having a first oxide layer disposed thereon; and
   a second electrode proximate a second side of the graphene membrane, the second electrode being electrically conductive and having a second oxide layer disposed thereon, the graphene membrane being suspended between the first electrode and the second electrode,
   wherein the device is a microphone.

2. The device of claim 1, further comprising:
   a first frame disposed on the first side of the graphene membrane;
   a second frame disposed on the second side of the graphene membrane, the first frame and the second frame both including substantially circular open regions that define a substantially circular portion of the graphene membrane; and
   a wire in electrical contact with the graphene membrane.

3. The device of claim 2, wherein the first frame and the second frame are about 60 microns to 180 microns thick.

4. The device of claim 2, wherein the first electrode is in contact with the first frame, wherein the first electrode is spaced a first distance of about 60 microns to 180 microns from the first side of the circular portion of the graphene membrane, wherein the second electrode is in contact with the second frame, and wherein the second electrode is spaced a second distance of about 60 microns to 180 microns from the second side of the circular portion of the graphene membrane.

5. The device of claim 2, wherein the first frame and second frame are a unitary body.

6. The device of claim 2, wherein the wire is a gold wire with a diameter of about 10 microns to 30 microns.

7. The device of claim 1, wherein the graphene membrane is about 20 nanometers to 40 nanometers thick.

8. The device of claim 1, wherein the first electrode and the second electrode define open regions having a dimension of about 200 microns to 300 microns.

9. The device of claim 1, wherein the first electrode and the second electrode include silicon wafers.

10. The device of claim 1, wherein the device is configured to have a frequency response across a frequency range at least from 20 Hz to 20 kHz or across the entire human audible frequency range.

11. A condenser microphone comprising:
    a graphene membrane;
    a first electrode proximate a first side of the graphene membrane, the first electrode being electrically conductive and having a first oxide layer disposed thereon; and
    a second electrode proximate a second side of the graphene membrane, the second electrode being electrically conductive and having a second oxide layer disposed thereon, the graphene membrane being suspended between the first electrode and the second electrode,
    wherein the condenser microphone is configured to have a frequency response across a frequency range at least from 20 Hz to 20 kHz or across the entire human audible frequency range.

12. The condenser microphone of claim 11, wherein the graphene membrane is a monolayer graphene membrane.

13. The condenser microphone of claim 11, wherein the graphene membrane is about 20 nanometers to 40 nanometers thick.

14. The condenser microphone of claim 11, wherein the graphene membrane is a multilayer graphene membrane.

15. A method comprising:
    (a) providing a device including:
    a graphene membrane;
    a first electrode proximate a first side of the graphene membrane, the first electrode being electrically conductive and having a first oxide layer disposed thereon; and
    a second electrode proximate a second side of the graphene membrane, the second electrode being electrically conductive and having a second oxide layer disposed thereon, the graphene membrane being suspended between the first electrode and the second electrode;
    (b) biasing the graphene membrane with a direct current voltage;
    (c) receiving a sound wave which causes the graphene membrane to vibrate;
    (d) measuring the frequency and/or the amplitude of the sound wave by measuring an output signal generated at the first electrode and/or the second electrode;
    wherein the device is configured to have a frequency response at least from 20 Hz to 20 kHz or across the entire human audible frequency range.

16. The method of claim 15, wherein the output signal is digitally recorded as an audio signal.

17. The method of claim 15, wherein the direct current voltage is about 50 volts to 150 volts or wherein an amplitude of the output signal is about 0 volts to 15 volts.

18. The method of claim 15, wherein the first electrode and the second electrode are biased at opposite polarities.

19. The method of claim 15, wherein the device further comprises:
    a first frame disposed on the first side of the graphene membrane;

a second frame disposed on the second side of the graphene membrane, the first frame and the second frame both including substantially circular open regions that define a substantially circular portion of the graphene membrane; and a wire in electrical contact with the graphene membrane.

20. The method of claim 15, wherein the graphene membrane is about 20 nanometers to 40 nanometers thick.

\* \* \* \* \*